United States Patent [19]

Katsuie

[11] Patent Number: 5,491,421
[45] Date of Patent: Feb. 13, 1996

[54] SHEET THICKNESS MEASURING APPARATUS WHICH MEASURES SHEET THICKNESS BASED ON CALCULATED CAPACITY AND RESISTENCE VALUES OF THE SHEET

[75] Inventor: Ichiro Katsuie, Takasaki, Japan

[73] Assignee: Canon Kabushiki Kaisha, Tokyo, Japan

[21] Appl. No.: 172,107

[22] Filed: Dec. 23, 1993

[30]      Foreign Application Priority Data

Dec. 26, 1992  [JP]  Japan ..................... 4-359189

[51] Int. Cl.$^6$ .............. G01N 27/02; G01B 7/06
[52] U.S. Cl. ............ 324/452; 324/671; 324/716; 427/10
[58] Field of Search ................... 324/649, 662, 324/663, 671, 701, 716, 720, 452; 427/10

[56]           References Cited

U.S. PATENT DOCUMENTS 3,341,774  9/1967  Dyben ..................... 324/663
3,857,095  12/1974 Mitchie et al. .............. 324/662 X
4,968,947  1/1990  Thorn ..................... 324/709 X
5,198,777  3/1993  Masuda et al. ............... 324/671
5,208,628  5/1993  Ohashi et al. ............... 355/27

*Primary Examiner*—Maura K. Regan
*Assistant Examiner*—Diep Do
*Attorney, Agent, or Firm*—Fitzpatrick, Cella, Harper & Scinto

[57]              ABSTRACT

A sheet thickness measuring apparatus includes an electrostatic capacity measuring device for measuring the eletrostatic capacity of a sheet, a resistance measuring device for measuring a resistance value of the sheet, and a calculator for calculating a thickness of the sheet on the basis of the electrostatic capacity measured by the electrostatic capacity measuring device and the resistance value measured by the resistance measuring device.

13 Claims, 7 Drawing Sheets

SHEET THICKNESS MEASURING APPARATUS WHICH MEASURES SHEET THICKNESS BASED ON CALCULATED CAPACITY AND RESISTENCE VALUES OF THE SHEET

BACKGROUND OF THE INVENTION

1. Field of the Invention

The present invention relates to a sheet thickness measuring apparatus for measuring the thickness of various sheets in an image forming apparatus, a sheet conveying apparatus or a sheet containing apparatus.

2. Related Background Art

Generally, in image forming apparatuses in which various sheets are handled, various obstacles or drawbacks often occur due to the deviation of the properties of sheets. In particular, many obstacles have a close relation to a thickness of the sheet, and, thus, various techniques for measuring the thickness of the sheet in an image forming apparatus have been proposed.

In one typical measuring technique, the photo-permeability of a sheet is measured by using an optical sensor of a permeable type and the thickness of the sheet is estimated on the basis of the measured result. In another measuring technique, a sheet is pinched between a pair of rollers, and the thickness of the sheet is measured by detecting the relative displacement of the rollers in a thickness direction of the sheet caused by the pinched sheet.

However, these conventional techniques have the following drawbacks.

In the above technique in which the sheet thickness is measured by using the optical sensor of a permeable type, the optical sensor is influenced by the color tone and tissue of the sheet, thereby causing a great error in the measurement of the thickness. On the other hand, in the above technique in which the sheet thickness is measured by using the rollers, since it is difficult to stabilize the mechanical movements of the rollers, setting aside the question of theory, it is difficult to put the technique to practical use. In other conventional techniques, many problems arise regarding the cost and stability.

Incidentally, although an electrostatic thickness measuring method is also known as a technique capable of measuring a thickness of a sheet with ease and with high accuracy, such method has not been applied to an image forming apparatus for the following reason. That is to say, although a paper sheet and a plastic film can be used in the image forming apparatus, particularly, since there are many kinds of paper sheets and the paper sheets are apt to be influenced by the environmental condition, the property value greatly differs from paper sheet to paper sheet. For example, the dielectric constant of the sheet is varied from paper sheet to paper sheet by about 50% at the maximum, and the resistivity of the sheet is varied by one figure depending upon the kind of paper sheet and by six figures depending upon the environment.

SUMMARY OF THE INVENTION

The present invention aims to eliminate the above-mentioned conventional drawbacks, and has an object to provide a sheet thickness measuring apparatus which can stably measure a thickness of a sheet with high accuracy in an image forming apparatus, regardless of the kinds of sheets and the surrounding environment.

BRIEF DESCRIPTION OF THE DRAWINGS

FIG. 4A shows an output signal Vin from a rectangular wave generation circuit, FIG. 4B shows an output signal Vc from an integrating circuit, FIG. 4C shows an output signal Vcomp from a comparator, and FIG. 4D shows an output signal Vout from an exclusive logic sum circuit;

DETAILED DESCRIPTION OF THE PREFERRED EMBODIMENTS

The present invention will now be described in connection with embodiments thereof with reference to the accompanying drawings.

Figure 1:
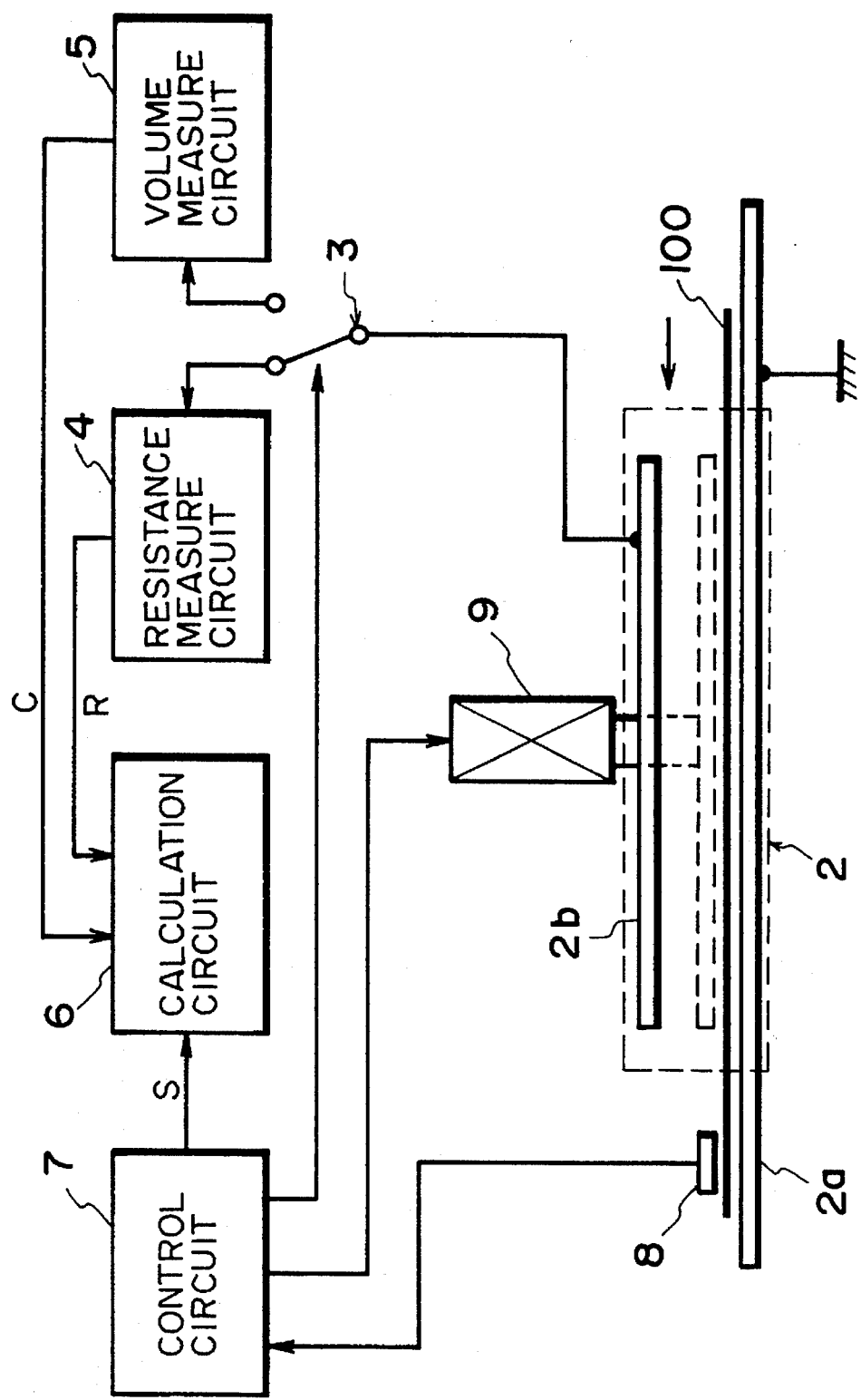
FIG. 1 is a block diagram showing a first embodiment (sheet thickness measuring apparatus) according to the present invention.

In FIG. 1 which is a block diagram showing a first embodiment (sheet thickness measuring apparatus) according to the present invention, a pair of electrodes 2 comprise a fixed metallic electrode 2a and movable metallic electrode 2b. The fixed electrode 2a is fixed in a sheet conveying is path and is grounded. On the other hand, the movable electrode 2b is opposed to the fixed electrode 2a and can be moved toward and away from the fixed electrode 2a and is connected to a switch 3.

The switch 3 serves to selectively connect the movable electrode 2b to a resistance measuring circuit 4 or a volume measuring circuit 5, and is switchably connected to the resistance measure circuit 4 and volume measuring circuit 5. The resistance measuring circuit 4 serves to measure the resistance value of a paper sheet 100 pinched between the pair of electrodes 2 and to output a signal R representative of the resistance value to a calculation circuit 6. On the other hand, the volume measuring circuit 5 serves to measure an electrostatic capacity value in a condition that the paper sheet 100 is being pinched between the pair of electrodes 2 and to output a signal C representative of the electrostatic capacity value to the calculation circuit 6.

The calculation circuit 6 serves to roughly calculate the dielectric constant of the paper sheet 100 on the basis of the resistance value given by the signal R and to calculate a thickness of the paper sheet 100 on the basis of the calculated dielectric constant and the electrostatic capacity value given by the signal C from the volume measure circuit 5. The calculation circuit 6 is controlled by a control circuit 7.

The control circuit 7 also controls an electromagnetic solenoid 9 and the switch 3, as well as the calculation circuit 6, and has a detector 8. More specifically, the detector 8 is arranged above a left end portion of the fixed electrode 2a. When a tip end of the sheet 100 conveyed from a direction shown by the arrow is detected by the detector 8, the control circuit 7 controls the electromagnetic force of the solenoid 9 on the basis of a detection signal from the detector. That is to say, the control circuit 7 controls a direction of current which flows in the solenoid 9, and the solenoid 9 shifts the movable electrode 2b toward on away from the fixed electrode 2a in accordance with the electromagnetic force. Then, the control circuit 7 switches the switch 3 from a condition that the movable electrode 2b is connected to the resistance measuring circuit 4 to a condition that the movable electrode 2b is connected to the volume measuring circuit 5, and outputs a signal representative of switching information of the switch 3 and presence/absence information of the sheet 100 to the calculation circuit 6.

Next, an operation of this embodiment will be described.

When the paper sheet 100 is conveyed from the direction shown by the arrow until the tip end of the sheet reaches below the detector 8, the detection signal from the detector 8 is sent to the control circuit 7. When the detection signal is received, the control circuit 7 controls the electromagnetic force of the solenoid 9, with the result that the movable electrode 2b is shifted toward the fixed electrode 2a, thereby pinching the sheet 100 between the movable and fixed electrodes 2b, 2a.

At the same time, the resistance value of the sheet 100 is measured by the resistance measuring circuit 4, and the signal representative of the resistance value is output to the calculation circuit 6. Then, the switch 3 is switched by the control circuit 7, with the result that the electrostatic capacity value of the electrodes 2 in the condition that the paper sheet 100 is pinched between the electrodes is measured by the volume measuring circuit 5, and the signal C representative of the electrostatic capacity value is sent from the volume measuring circuit 5 to the calculation circuit 6.

In the calculation circuit 6, the thickness of the sheet is calculated on the basis of the signals R, C and an information signal from the control circuit 7. That is to say, the dielectric constant of the sheet 100 is estimated from the signal R representative of the resistance value, and the thickness of the sheet 100 is calculated on the basis of the signal C representative of the measured capacity value by using the dielectric constant.

Figure 2:
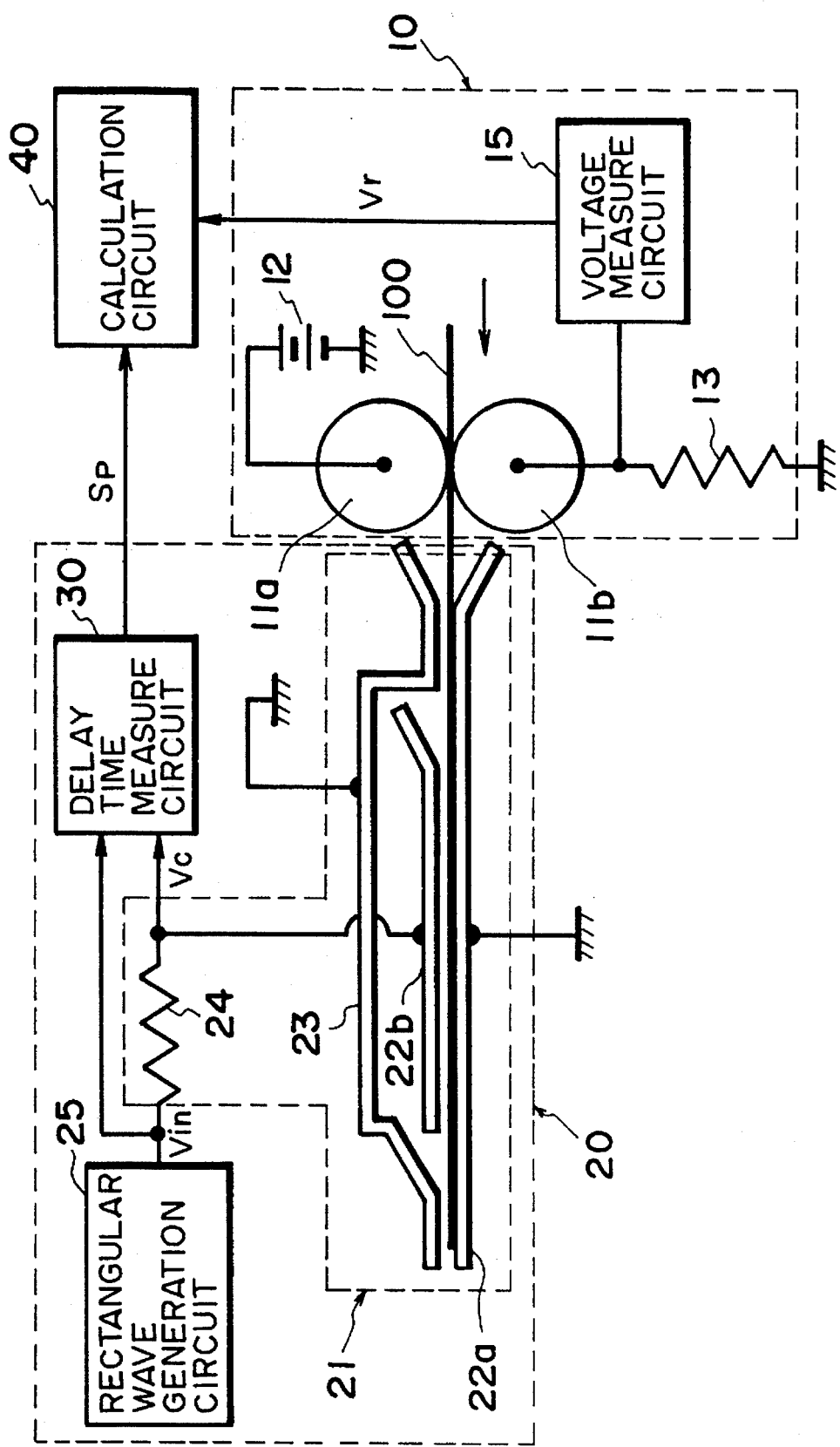
FIG. 2 is a block diagram showing a second embodiment (sheet thickness measuring apparatus) according to the present invention.

FIG. 2 is a block diagram showing a second embodiment (sheet thickness measuring apparatus) according to the present invention.

In this embodiment, the sheet thickness measuring apparatus comprises a voltage measuring portion 10 for measuring a voltage associated with the resistance value of the paper sheet 100, a volume change measuring portion 20 for measuring a delay time associated with the capacity value of the paper sheet 100, and a calculation circuit 40 for calculating a thickness of the paper sheet 100 on the basis of the measured values from the voltage measuring portion 10 and the volume change measuring portion 20.

The voltage measuring portion 10 has a pair of conductive rollers 11a, 11b arranged in a sheet conveying path, and a voltage measure circuit 15. The roller 11a is connected to a DC voltage source 12 so that a DC voltage is applied to the roller 11a in a conventional manner. On the other hand, the roller 11b is connected to the voltage measuring circuit 15 and is grounded via a conventional reference resistor 13.

With this arrangement, the voltage applied from the DC voltage source 12 is divided by the rollers 11a, 11b, the paper sheet 100 between the rollers 11a, 11b and the reference resistor 13. The divided voltage values are measured by the voltage measuring circuit 15, and a signal Vr representative of the divided voltage ratio is output to the calculation circuit 40.

The volume change measuring portion 20 comprises an integrating circuit 21, a rectangular wave generation circuit 25, and a delay time measure circuit 30. The integrating circuit 21 comprises a pair of fixed electrodes 22a, 22b which are guarded by a guard electrode 23 and one of which is grounded and the other of which is connected to a reference resistor 24. The pair of fixed electrodes 22a, 22b constitute a capacitor. More particularly, the grounded fixed electrode 22a is arranged at a downstream side of the pair of rollers 11a, 11b, and the fixed electrode 22b which is connected to the reference resistor 24 is arranged above the fixed electrode 22a so that the sheet 100 can enter between the electrodes 22a, 22b. The rectangular wave generation circuit 25 is connected to an input terminal of the reference resistor 24 and the delay time measuring circuit 30 is connected to an output terminal of the reference resistor 24. With this arrangement, when the sheet 100 is introduced between the fixed electrodes 22a, 22b, since the capacity of the capacitor (constituted by the fixed electrodes 22a, 22b) is increased in response to the thickness, dielectric constant and resistivity of the sheet 100, the time constant of the integrating circuit 21 is also increased in correspondence to the capacity.

Figure 4:
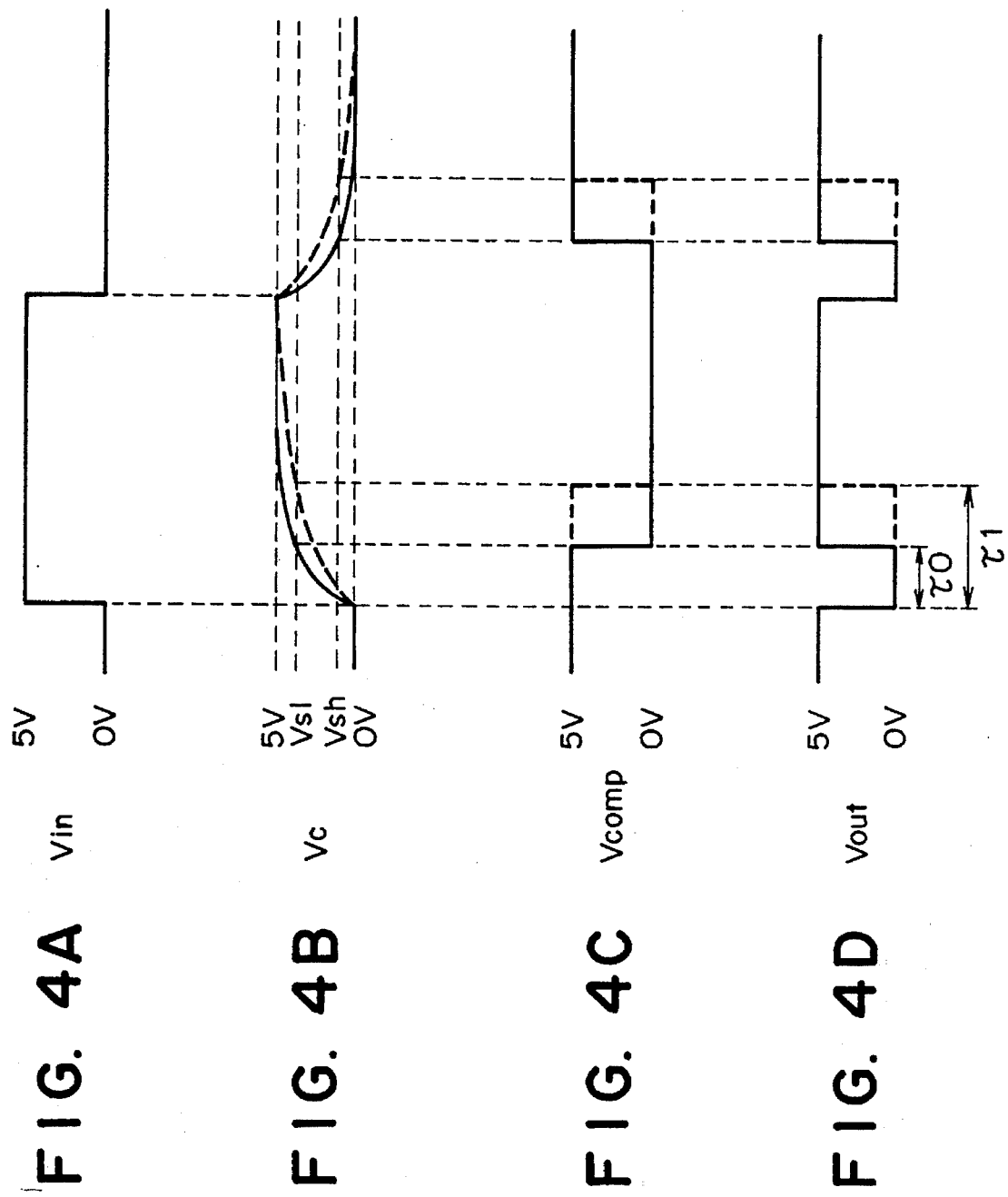
FIGS. 4A to 4D are output signal timing charts according to the embodiment of the present invention, where

As shown in FIG. 4A, the rectangular wave generation circuit 25 is a circuit for generating a rectangular pulse voltage having a pulse width of 5 msec, and an amplitude of 5 V, and the pulse voltage signal Vin is input to the integrating circuit 21 and the time delay measure circuit 30. Accordingly, the pulse voltage signal Vin input from the rectangular wave generation circuit 25 to the integrating circuit 21 is integrated in response to the time constant of the integrating circuit 21 and is output from the integrating circuit 21 as a voltage signal Vc curved as shown in FIG. 4B.

Figure 3:
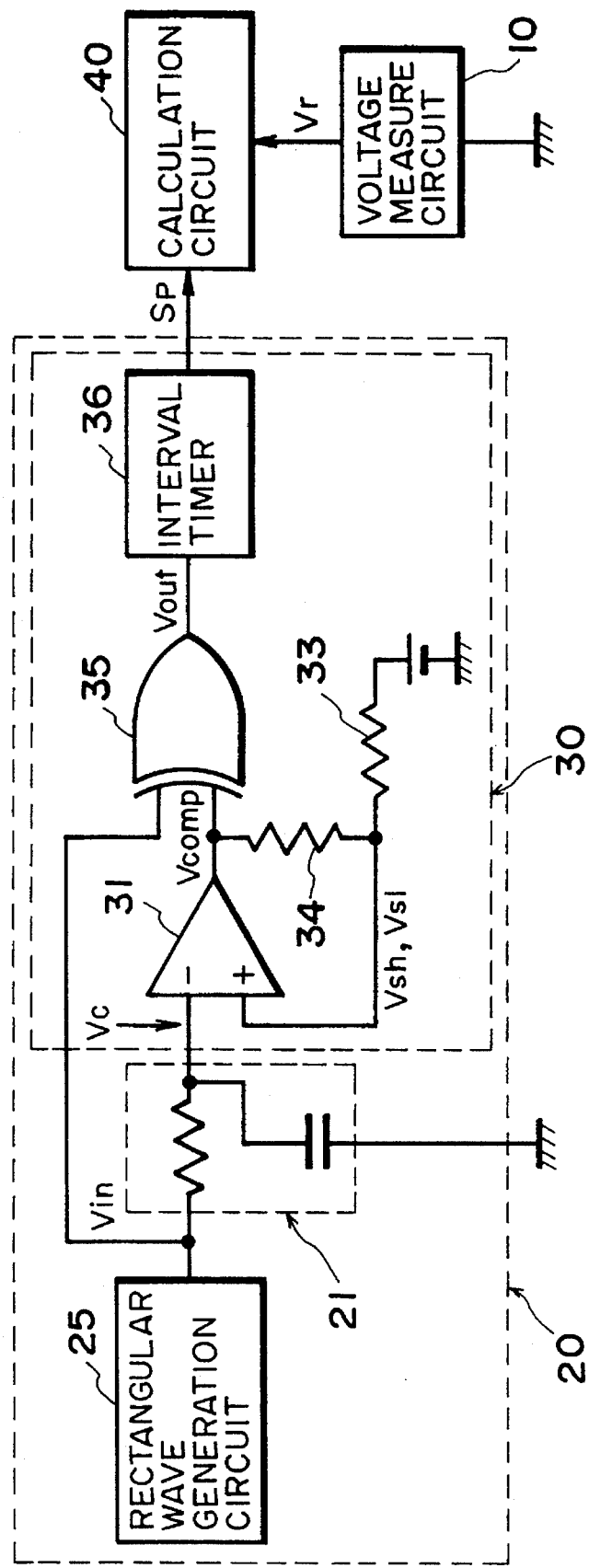
FIG. 3 is a block diagram showing a delay time measure circuit.

The delay time measuring circuit 30 has a construction as shown in FIG. 3. More specifically, it comprises a comparator 31 having a negative input terminal for receiving the voltage signal Vc from the integrating circuit 21 and a positive input terminal for receiving threshold voltages Vsh, Vsl having hysteresis and formed by a DC voltage source 32 and reference resistors 33, 34. The comparator 31 is designed so that, when the rising and setting of the voltage signal Vc from the integrating circuit 21 corresponds to the threshold voltages Vsh, Vsl, respectively, the output of the comparator is reversed. That is to say, when the voltage signal Vc as shown in FIG. 4B is input, a reverse pulse signal Vcomp as shown in FIG. 4C is output from the comparator 31. An output terminal of such comparator 31 is connected to one of the input terminals of a gate 35.

The other input terminal of the gate 35 is connected to an output terminal of the rectangular wave generation circuit 25, so that the exclusive logic sum of the pulse voltage signal Vin from the rectangular wave generation circuit 25 and the reverse pulse signal Vcomp from the comparator 31 is formed in the gate. The gate outputs a reverse pulse voltage signal Vout proportional to the delay time to an interval timer 36. The interval timer 36 serves to measure a pulse width of the reverse voltage pulse signal Vout input from the gate 35 and to output a measure signal Sp to the calculation circuit 40.

The calculation circuit 40 calculates the resistance value of the sheet 100 on the basis of a divided voltage ratio signal Vr from the voltage measuring circuit 15 of the voltage measuring portion 10 and creates a difference between a delay time $\tau_0$ (when the sheet 100 does not exist between the fixed electrodes 22a and 22b) and a delay time $\tau_1$ (when the sheet 100 exists between the fixed electrodes 22a and 22b) on the basis of the measure signal Sp from the interval timer 36. Further, the calculation circuit 40 serves to determine the return straight line for the thickness of the sheet 100 regarding the delay time change amount $(\tau_1-\tau_0)$ on the basis of the resistance value and to convert the delay time change amount $(\tau_1-\tau_0)$ into the thickness of the sheet 100.

Next, an operation of this embodiment will be described.

When the paper sheet 100 is introduced between the rollers 11a and 11b, the voltage applied from the DC voltage source 12 of the voltage measuring portion 10 is divided by the rollers 11a, 11b, the sheet 100 between the rollers 11a, 11b and the reference resistor 13. The divided voltages are measured by the voltage measuring circuit 15, and the signal Vr representative of the divided voltage ratio is output to the calculation circuit 40. On the other hand, in the volume change measuring portion 20, the pulse voltage signal Vin shown in FIG. 4A is sent from the rectangular wave generation circuit 25 to the integrating circuit 21 and the delay time measuring circuit 30.

The time constant of the integrating circuit 21 is increased in response to the capacity of the fixed electrodes 22a, 22b corresponding to the thickness dielectric constant and resistivity of the sheet 100 introduced between the fixed electrodes 22a and 22b. Accordingly, the pulse voltage signal Vin input to the integrating circuit 21 is integrated in response to the time constant, so that the voltage signal Vc shown in FIG. 4B is sent from the integrating circuit 21 to the delay time measure circuit 30. The voltage signal Vc is input to the comparator 31 of the delay time measuring circuit 30. When the rising and the setting of the voltage signal Vc correspond to the threshold voltages Vsh, Vsl, respectively, the output of the comparator is reversed, and the reverse pulse signal Vcomp is output from the comparator 31. That is to say, when the sheet 100 exists between the fixed electrodes 22a, 22b, the voltage signal Vc as shown by the solid line in FIG. 4B is input to the comparator, and the reverse pulse signal Vcomp as shown by the solid line in FIG. 4C is sent from the comparator 31 to the gate 35. On the other hand, when the sheet 100 does not exist between the fixed electrodes 22a, 22b, the voltage signal Vc as shown by the broken line in FIG. 4B is input to the comparator, and the reverse pulse signal Vcomp as shown by the broken line in FIG. 4C is sent from the comparator 31 to the gate 35.

The exclusive logic sum of the pulse voltage signal Vin from the rectangular wave generation circuit 25 and the reverse pulse voltage signal Vcomp from the comparator 31 is created in the gate 35, and the reverse pulse voltage signal Vout proportional to the delay time of the reverse pulse signal Vcomp is output to the interval timer 36. The measure signal Sp representative of the pulse width of the input reverse voltage pulse signal Vout is sent from the interval timer 36 to the calculation circuit 40.

In this way, when the measure signal Sp from the volume change measuring portion 20 and the divided voltage ratio signal Vr from the voltage measuring portion 10 are input to the calculation circuit 40, the calculation circuit 40 calculates the resistance value of the sheet 100 on the basis of the divided voltage ratio signal Vr and calculates the difference $(\tau_1-\tau_0)$ between the delay time $\tau_0$ (when the sheet 100 does not exist between the fixed electrodes 22a, 22b) and the delay time $\tau_1$ (when the sheet 100 exists between the fixed electrodes 22a, 22b) on the basis of the measure signal Sp. Then, the return straight line for the thickness of the sheet 100 regarding the delay time change amount $(\tau_1-\tau_0)$ corresponding to the resistance value is determined or selected from lines shown in FIG. 6, and the delay time change amount $(\tau_1-\tau_0)$ is converted into the thickness of the sheet 100 on the basis of the determined return straight line.

Figure 5:
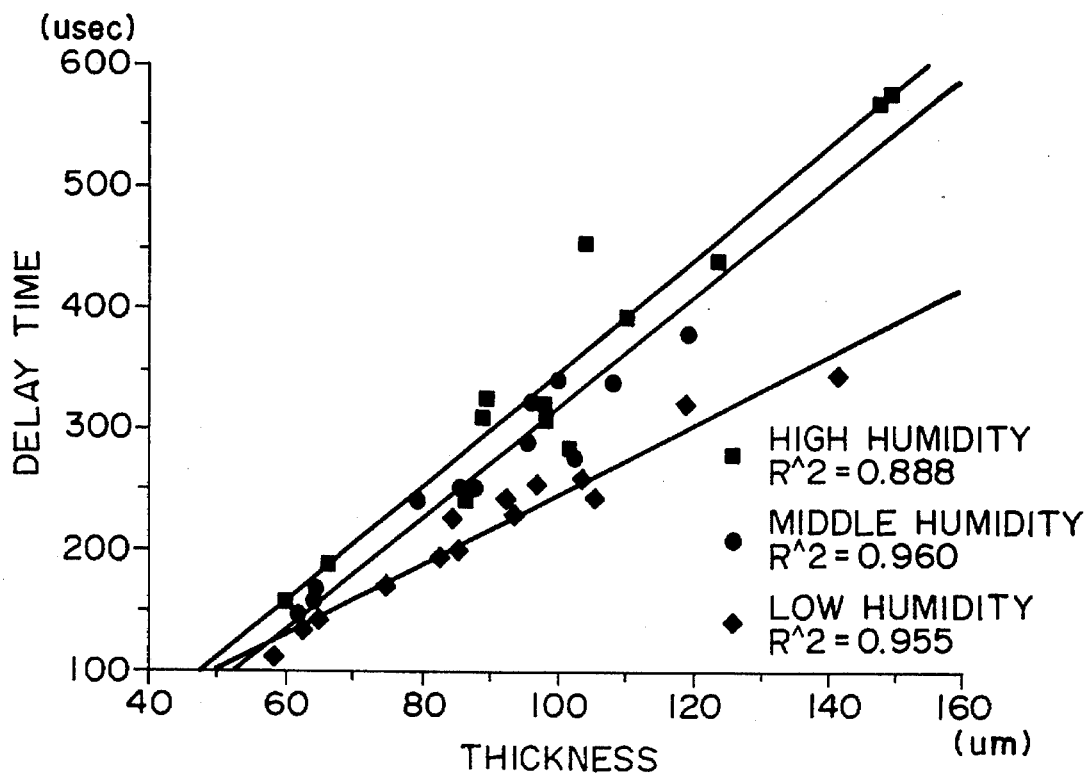
FIG. 5 is a graph showing a relation between a sheet thickness and a delay time.
Figure 6:
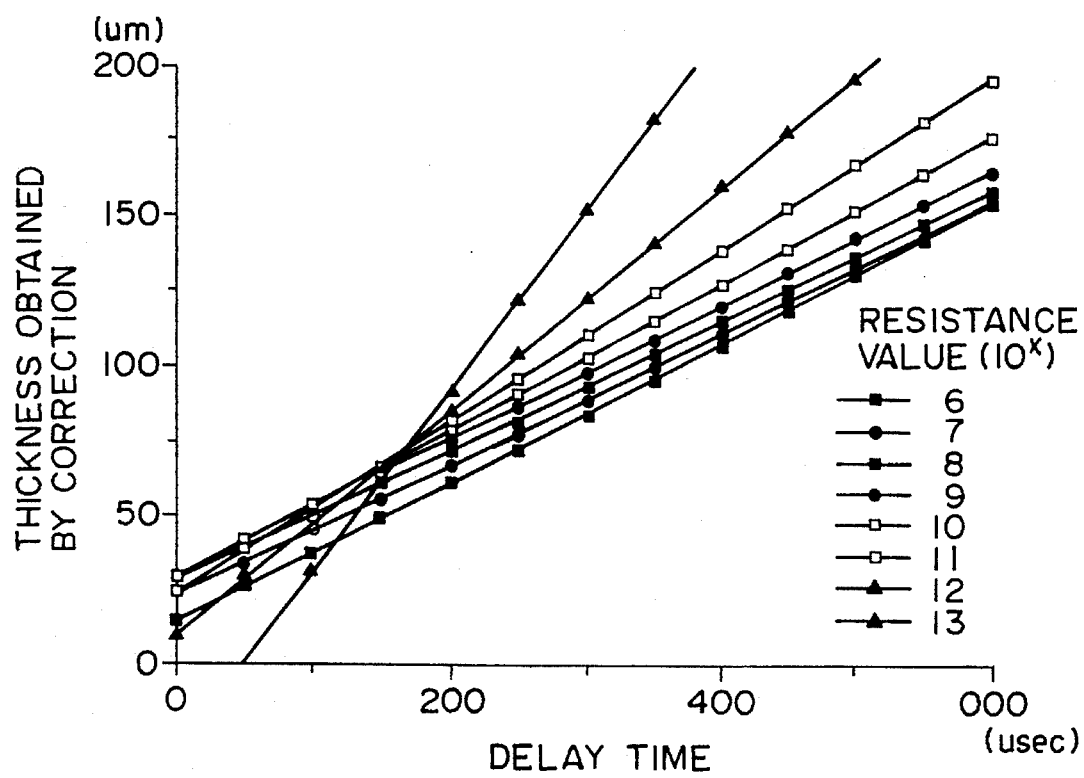
FIG. 6 is a graph showing a relation between a sheet thickness obtained by a resistance value correction and a delay time.
Figure 7:
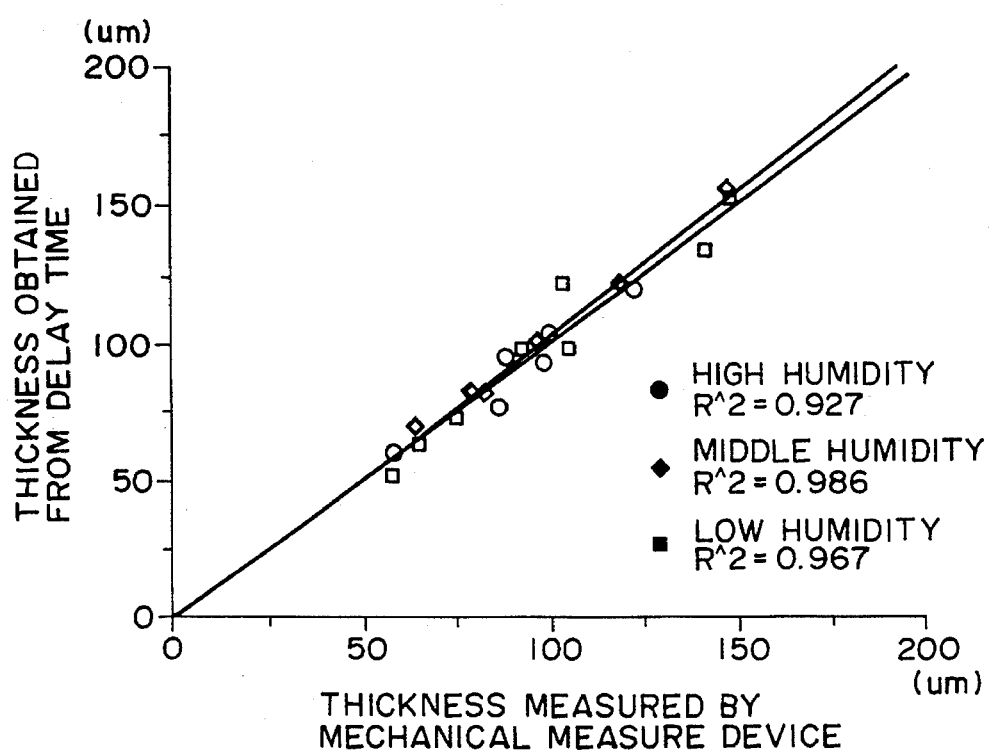
FIG. 7 is a graph showing a relation between a measured thickness and an actual thickness.

In this way, by considering the resistance value of the sheet 100, the thickness of the sheet 100 calculated by the calculation circuit 40 accurately approaches the actual thickness of the sheet. That is to say, as shown in FIG. 5, if the thickness of the sheet 100 is measured only on the basis of the delay time change amount, the measured results are dispersed depending upon the environmental change (high humidity, middle humidity and low humidity). However, as shown in FIG. 6, when the return straight line regarding the delay time change amount and the sheet thickness is corrected by using the resistance value, as shown in FIG. 7, it is possible to obtain a measured result which accurately approaches the actual sheet thickness, without being influenced by the environmental change (high humidity, middle humidity and low humidity). Incidentally, the graphs shown in FIGS. 5, 6 and 7 were obtained from the test data.

In this way, according to the sheet thickness measuring apparatus of the illustrated embodiment, the relation between the sheet thickness value measured by this apparatus and the actual sheet thickness value is superior to the relation between the delay time itself and the sheet thickness, under all of the circumstances, and, accordingly, the measuring error depending upon the kinds of sheets can be reduced.

Further, when the sheet 100 is being passed between the rollers 11a and 11b in the conveying path and between the fixed electrodes 22a and 22b, the sheet thickness can be measured with an accuracy of about 50% without stopping the movement of the sheet 100. In this case, since the sheet 100 is not stopped during the measurement of the sheet thickness, the conveying operation for the sheet 100 is not affected by a bad influence.

Figure 8:
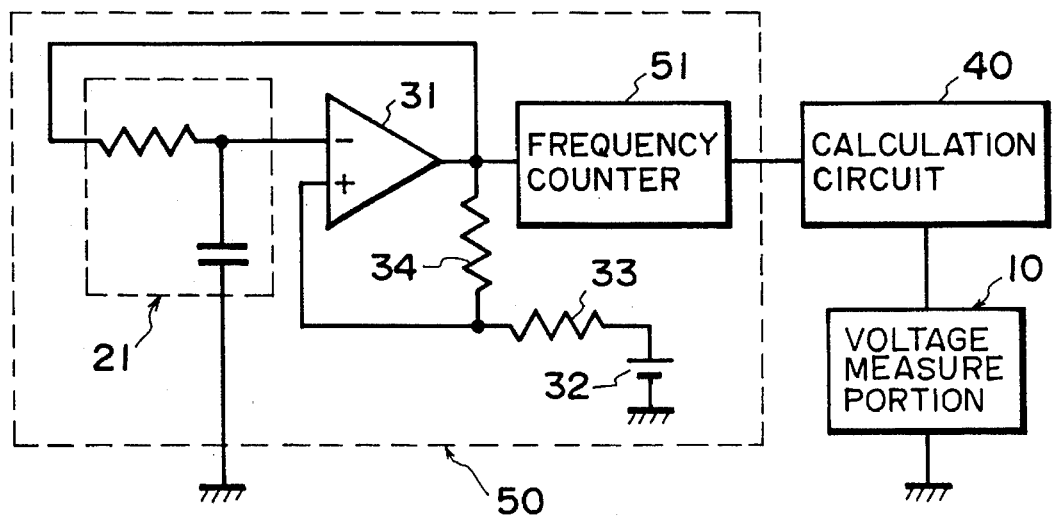
FIG. 8 is a block diagram showing an alteration of a volume change measuring portion.

FIG. 8 shows an alteration of the volume change measuring portion.

In this alteration, a volume change measure portion 50 utilizes a frequency counter 51 in place of the gate 35 and the interval timer 36 of the volume change measuring portion 20 in FIG. 3, and is designed so that the output of the comparator 31 is returned to the integrating circuit 21 without using the rectangular wave generation circuit 25. That is to say, a positive return signal and a negative return signal with time delay are applied to the comparator 31. Accordingly, as the output of the comparator 31, a rectangular wave having the frequency proportional to the time constant of the integrating circuit 21 is obtained. After a frequency of the rectangular wave is measured by the frequency counter 51, the output of the comparator 31 is sent to the calculation circuit 40.

Incidentally, in the integrating circuit 21 used with the Volume change measuring portion 50 and with the volume change measuring portion 20 of FIG. 3, it is preferable that a surface of at least one of the fixed electrodes 22a, 22b is subjected to an insulation treatment. By effecting the insulation treatment, if the sheet 100 is contacted with both of the fixed electrodes 22a, 22b, electrical short-circuiting between the fixed electrodes 22a, 22b is prevented, thereby improving and stabilizing the measuring accuracy.

Figure 9:
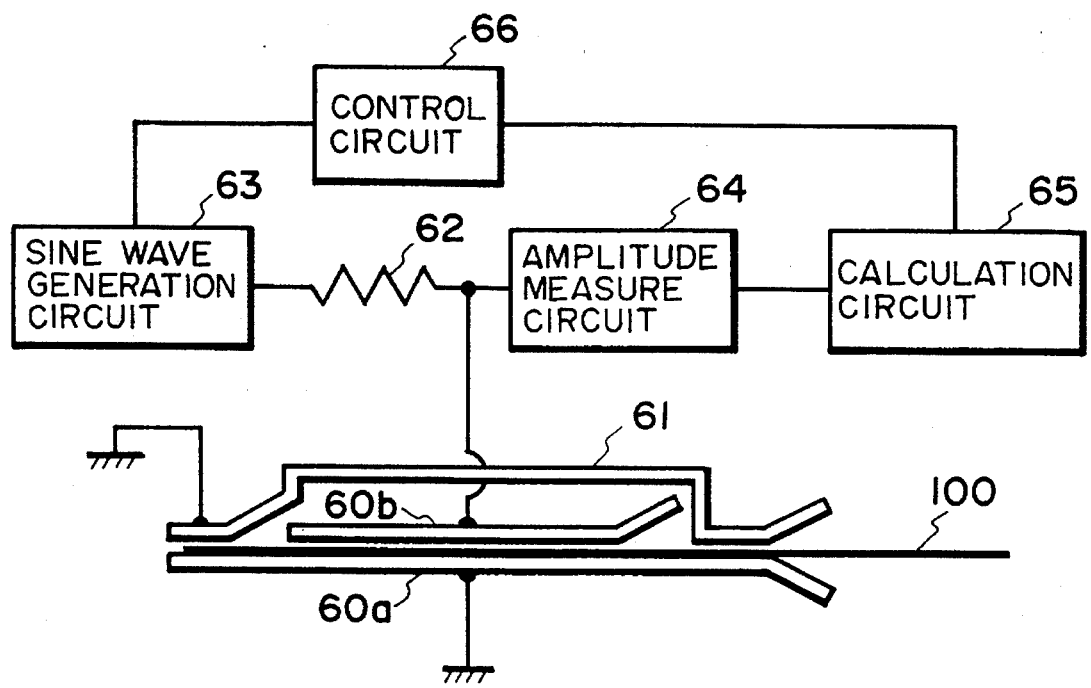
FIG. 9 is a block diagram showing a third embodiment (sheet thickness measuring apparatus) according to the present invention.

FIG. 9 is a block diagram showing a third embodiment (sheet thickness measuring apparatus) according to the present invention.

In this embodiment, fixed electrodes 60a, 60b guarded by a guard electrode 61 are arranged in a conveying path for the sheet 100, and the fixed electrode 60b is connected to a sine wave generation circuit 63 having variable frequency (via a reference resistor 62) and to an amplitude measuring circuit 64. An output terminal of the amplitude measuring circuit 64 is connected to a calculation circuit 65. The calculation circuit 65 and the sine wave generation circuit 63 are controlled by a control circuit 66.

More specifically, the control circuit 66 gives instructions to the sine wave generation circuit 63 to switch the oscillation frequency and sends the data of the oscillation frequency to the calculation circuit 65. On the other hand, the amplitude measuring circuit 64 measures the AC voltage generated in the fixed electrodes 60a, 60b and sends the measured result to the calculation circuit 65. Since the AC voltage is varied in accordance with the thickness, resistance value and dielectric constant of the sheet 100 introduced between the fixed electrodes 60a, 60b, the calculation circuit 65 can determine the thickness of the sheet 100 on the basis of the measured amplitude values of two frequencies (frequency of the AC voltage and oscillation frequency).

For example, it is assumed that when the frequency is $H_1$ the amplitude is $V_1$ and when the frequency is $H_2$ the amplitude is $V_2$. When the capacity of the paper sheet is C and the resistance value of the paper sheet is r, the following relations can be obtained:

$f(H_1, C, r) = V_1$; and $f(H_2, C, r) = V_2$.

By solving the above simultaneous equations by means of the calculation circuit 65, the capacity C and the resistance value r of the paper sheet are calculated. By referring to the data of the return straight lines representative of the relation between the capacity and the resistance value stored in a memory in the calculation circuit, the thickness of the paper sheet is determined on the basis of the calculated capacity C and resistance value r.

Alternatively, by storing a map data capable of retrieving the thickness directly from the amplitudes $V_1$, $V_2$ in the memory, the thickness may be calculated.

Incidentally, when an object to be measured is a paper sheet, since the material value is greatly varied, in some cases, the thickness cannot be determined with adequate accuracy by the measurement of only two frequencies. In such cases, it should be noted that, by measuring three or four frequencies, the thickness can be measured with high accuracy.

Further, similar to the above-mentioned second embodiment, by effecting the insulation treatment regarding a surface of at least one of the fixed electrodes 60a, 60b, the measurement can be stabilized. In addition, the thickness of the sheet can be determined by measuring the phase angles of the applied signals as well as the amplitudes.

Figure 10:
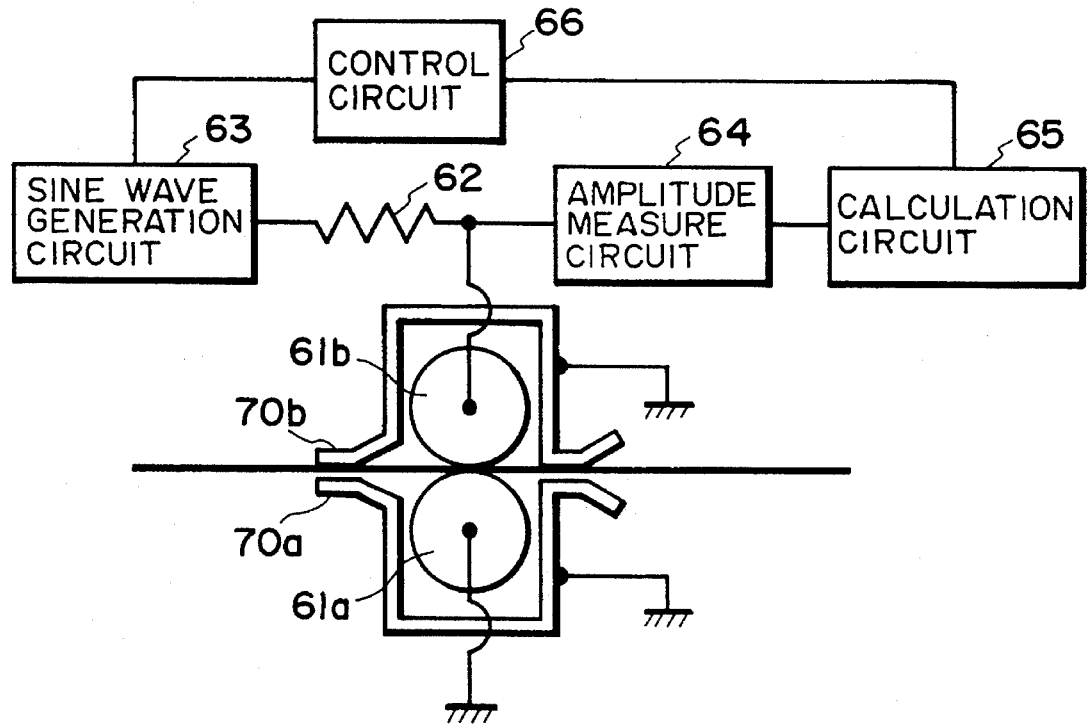
FIG. 10 is a block diagram showing a fourth embodiment (sheet thickness measuring apparatus) according to the present invention.

FIG. 10 is a block diagram showing a fourth embodiment (sheet thickness measuring apparatus) according to the present invention.

In this embodiment, in place of the fixed electrodes 60a, 60b, a pair of conductive rollers 70a, 70b are used, and both conductive rollers 70a, 70b are guarded by guard electrodes 61a, 61b. Other construction is the same as that of the third embodiment.

With this arrangement, it is possible to measure the electrical response regarding the nip capacity and the resistance when the paper sheet 100 is introduced between the conductive rollers 70a, 70b. When the conductive rollers 70a, 70b are formed from elastic material, the change of the nip can be stabilized and the influence due to the wear of the rollers can be reduced, thereby permitting the measurement of the sheet thickness with high accuracy and stability, in comparison with the case where the rollers are formed from rigid material.

Incidentally, by effecting the insulation treatment regarding a surface of at least one of the rollers 70a, 70b, it is possible to avoid the influence due to the contact between the paper sheet 100 and the rollers 70a, 70b in the proximity of the nip, thereby stabilizing the measurement.

Since the other construction and function are the same as those of the third embodiment, the description thereof is omitted.

As mentioned above, according to the present invention, since the measured result is not influenced by the kinds of sheets and the environment, the sheet thickness can be determined correctly.

Further, by effecting the insulation treatment regarding the surface of at least one of the paired measurement electrodes, since electrical short-circuits between the electrodes can be prevented, it is possible to measure the sheet thickness with high accuracy and stability.

What is claimed is:

1. A sheet thickness measuring apparatus comprising:

electrostatic capacity measuring means for measuring the electrostatic capacity of a sheet;

resistance measuring means for measuring a resistance value of the sheet; and calculation means for calculating a thickness of the sheet on the basis of the electrostatic capacity measured by said electrostatic capacity measuring means and the resistance value measured by said resistance measuring means.

2. A sheet thickness measuring apparatus according to claim 1, wherein said capacity measuring means has a pair of electrodes arranged to interpose the sheet therebetween.

3. A sheet thickness measuring apparatus according to claim 1, wherein said capacity measuring means has an integrating circuit including a pair of electrodes.

4. A sheet thickness measuring apparatus according to claim 3, wherein said capacity measuring means has a rectangular wave generation means for applying a rectangular pulse voltage to said integrating circuit.

5. A sheet thickness measuring apparatus according to claim 4, wherein said capacity measuring means calculates the electrostatic capacity of the sheet on the basis of a time delay of an output from said integration circuit with respect to the voltage input by said rectangular wave generation means.

6. A sheet thickness measuring apparatus according to claim 5, wherein said calculation means calculates the electrostatic capacity of the sheet on the basis of a difference between a time delay of an output from said calculation circuit with respect to the voltage input by said rectangular wave generation means when the sheet does not exist between said electrodes, and a time delay of the output from said calculation circuit with respect to the voltage input by said rectangular wave generation means when the sheet exists between said electrodes.

7. A sheet thickness measuring apparatus according to claim 6, wherein said calculation means has a memory in which the data of the differences in the time delay corresponding to the resistance values measured by said resistance measuring means are stored.

8. A sheet thickness measuring apparatus according to claim 7, wherein said calculation means selects the thickness from the data stored in said memory, on the basis of a signal representative of the difference in the time delay from said capacity measuring means and a signal representative of the measured resistance value from said resistance measuring means.

9. A sheet thickness measuring apparatus comprising:

electrostatic capacity measuring means for generating a signal with respect to an electrostatic capacity of a sheet whose thickness is to be measured;

resistance measuring means for generating a signal with respect to a resistance value of the sheet; and calculation means for calculating a thickness of the sheet on the basis of the signal of the electrostatic capacity and the signal of the resistance value generated by said electrostatic capacity measuring means and said resistance measuring means, respectively.

10. A sheet thickness measuring apparatus according to claim 9, wherein said electrostatic capacity measuring means comprises a volume change measuring means for measuring a delay time associated with the electrostatic capacity of the sheet, and said resistance measuring means comprises a voltage measuring means for measuring a voltage associated with the resistance value of the sheet.

11. A sheet thickness measuring apparatus according to claim 10, wherein said volume change measuring means comprises an integrating circuit, a rectangular wave generation means for applying a rectangular pulse voltage to said integrating circuit and a time delay measuring circuit for measuring a time delay of an output from said integrating circuit with respect to the voltage input by said rectangular wave generation means.

12. A sheet thickness measuring apparatus according to claim 10, wherein said resistance measuring means comprises a DC voltage source and a voltage measuring circuit for measuring divided voltage values applied from said DC voltage source and divided by the sheet and a reference resistor.

13. A sheet thickness measuring apparatus according to claim 10, wherein said calculation means for calculating the thickness of the sheet on the basis of a signal generated from said volume change measuring means with respect to the delay time associated with the electrostatic capacity of the sheet, and a signal generated by said voltage measuring means with respect to the voltage associated with the resistance value of the sheet.

* * * * *

UNITED STATES PATENT AND TRADEMARK OFFICE
CERTIFICATE OF CORRECTION

PATENT NO. : 5,491,421

DATED : February 13, 1996

INVENTOR : Ichiro Katsuie

It is certified that error appears in the above-identified patent and that said Letters Patent is hereby corrected as shown below:

Title page;

Under [54] Title, "RESISTENCE" should read —RESISTANCE—.

COLUMN 1

Line 4, "RESISTENCE" should read —RESISTANCE—.

COLUMN 2

Line 49, "is" (second occurrence) should be deleted; and
  Line 58, "measure" should read --measuring--.

COLUMN 3

Line 17, "on" should read --or--.

COLUMN 4

Line 17, "measure" should read --measuring--.

UNITED STATES PATENT AND TRADEMARK OFFICE
CERTIFICATE OF CORRECTION

PATENT NO. : 5,491,421

DATED : February 13, 1996

INVENTOR : Ichiro Katsuie

It is certified that error appears in the above-identified patent and that said Letters Patent is hereby corrected as shown below:

COLUMN 6

Line 51, "measure" should read --measuring--; and
Line 66, "Volume" should read --volume--.

Signed and Sealed this

Thirtieth Day of July, 1996

Attest:

BRUCE LEHMAN

Attesting Officer    Commissioner of Patents and Trademarks